(12) United States Patent
Ou

(10) Patent No.: US 10,193,589 B1
(45) Date of Patent: Jan. 29, 2019

(54) ELECTRONIC DEVICE

(71) Applicant: GETAC TECHNOLOGY CORPORATION, Hsinchu County (TW)

(72) Inventor: Po-Yi Ou, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/035,539

(22) Filed: Jul. 13, 2018

(30) Foreign Application Priority Data

Jan. 12, 2018 (CN) .......................... 2018 1 0029689

(51) Int. Cl.
| | |
|---|---|
| *H04B 1/3883* | (2015.01) |
| *H04M 1/02* | (2006.01) |
| *H01M 2/10* | (2006.01) |
| *G06F 1/16* | (2006.01) |

(52) U.S. Cl.
CPC ......... *H04B 1/3883* (2013.01); *G06F 1/1679* (2013.01); *H01M 2/1033* (2013.01); *H01M 2/1044* (2013.01); *H01M 2/1055* (2013.01); *H01M 2/1066* (2013.01); *H04M 1/0262* (2013.01)

(58) Field of Classification Search
CPC .......................... H04B 1/3883; H01M 2/1066; H01M 2/1033; H01M 2/1044; H01M 2/1055; H04M 1/0262; G06F 1/1679
See application file for complete search history.

(56) References Cited

U.S. PATENT DOCUMENTS

| | | | | |
|---|---|---|---|---|
| 7,318,731 B2 * | 1/2008 | Lin | ...................... | H01M 2/1016 439/97 |
| 7,322,835 B2 * | 1/2008 | Lin | ...................... | H01R 13/6275 439/100 |
| 8,369,088 B2 * | 2/2013 | Wang | ...................... | H01M 2/1066 361/679.55 |
| 8,837,145 B2 * | 9/2014 | Huang | ...................... | G06F 1/1635 361/679.55 |
| 10,050,455 B2 * | 8/2018 | Hsu | ...................... | H02J 7/0044 |
| 2004/0214077 A1 * | 10/2004 | Huang | ...................... | H01M 2/1066 429/97 |
| 2009/0059482 A1 * | 3/2009 | Hsu | ...................... | H01M 2/1061 361/679.01 |

(Continued)

*Primary Examiner* — Nidhi Thaker

(57) ABSTRACT

An electronic device includes a housing, a locking assembly and a battery demountably disposed on the housing and including a first engaging portion. The locking assembly includes a limiting element, a pressing element and a linking element movably disposed on the housing and includes a second engaging portion. The first and second engaging portions engage, allowing the battery to be fixedly disposed on the housing. The limiting element is disposed on the housing and includes first and second limiting portions. The pressing element is connected to the linking element and disposed at the first limiting portion to fix relative positions of the first and second engaging portions. When the pressing element separates from the first limiting portion and moves to the second limiting portion, the linking element drives the second engaging portion to separate from the first engaging portion, causing the battery to separate from the housing.

13 Claims, 5 Drawing Sheets

(56) References Cited

U.S. PATENT DOCUMENTS

| | | | | |
|---|---|---|---|---|
| 2010/0136397 A1* | 6/2010 | Lu | ........................ | H01M 2/1066 |
| | | | | 429/100 |
| 2011/0052955 A1* | 3/2011 | Chu | .................... | H04M 1/0262 |
| | | | | 429/97 |
| 2012/0052355 A1* | 3/2012 | Chiang | ............... | H01M 2/1066 |
| | | | | 429/96 |
| 2012/0087071 A1* | 4/2012 | Yang | ......................... | E05C 1/04 |
| | | | | 361/679.01 |

* cited by examiner

ELECTRONIC DEVICE

CROSS-REFERENCE TO RELATED APPLICATIONS

This application claims priority from China Patent Application No. 201810029689.9, filed on Jan. 12, 2018, the entire disclosure of which is hereby incorporated by reference.

BACKGROUND OF THE INVENTION

Field of the Invention

The present invention relates to electronic devices and, more particularly, to an electronic device with a separable battery.

Description of the Prior Art

Every portable electronic device, such as a notebook computer or a tablet, has a battery so that a user can carry and use the portable electronic device. Batteries of portable electronic devices fall into two categories: inseparable batteries and separable batteries. A portable electronic device with a separable battery is advantageous in that the battery can be changed at any time. To meet the need to change a battery and allow a user to change the battery quickly, a conventional portable electronic device has a housing which comes with a battery fixing mechanism, allowing the battery to be fixed to the housing easily and separated therefrom easily.

The battery fixing mechanism of the conventional portable electronic device comprises a key and a tenon connected to the key, allowing the tenon to engage with an engagement point of a battery. When a user presses or moves the key in a specific direction, the key drives the tenon to separate from the engagement points such that the battery is no longer restricted by the tenon, allowing the battery to separate from the portable electronic device.

SUMMARY OF THE INVENTION

Although a battery fixing mechanism of the conventional electronic device enables a battery to be easily changed, it has a drawback described below. If the electronic device is hit or falls off to the ground, the key will be subjected to a stress in a specific direction; meanwhile, the key moves in the direction, and a tenon becomes disengaged, causing the battery to separate from the electronic device inadvertently. Therefore, not only is the battery likely to be damaged, but data loss is also likely to happen to the electronic device in operation because of power interruption.

In view of the aforesaid drawbacks of the prior art, it is an objective of the present invention to provide an electronic device characterized in that, although a battery is easy to change, the battery is unlikely to separate from the electronic device inadvertently even when the electronic device is hit or falls off.

In an embodiment, an electronic device comprises a housing, a battery and a locking assembly. The battery is demountably disposed on the housing. The battery comprises a first engaging portion. The locking assembly comprises a linking element, a limiting element and a pressing element. The linking element is movably disposed on the housing. The linking element comprises a second engaging portion. The second engaging portion engages with the first engaging portion, allowing the battery to be fixedly disposed on the housing. The limiting element is disposed on the housing. The limiting element comprises a first limiting portion and a second limiting portion. The pressing element is connected to the linking element and disposed at the first limiting portion to fix relative positions of the first engaging portion and the second engaging portion, wherein, when the pressing element separates from the first limiting portion and moves to the second limiting portion, the linking element drives the second engaging portion to separate from the first engaging portion, causing the battery to separate from the housing.

In an embodiment, the pressing element moves in a first direction to separate from the first limiting portion, whereas the linking element drives the second engaging portion to move in a second direction and thereby separate from the first engaging portion, wherein the first direction and the second direction are not parallel.

In an embodiment, the first direction and the second direction are perpendicular to each other.

In an embodiment, the limiting element further comprises a passage whereby the two openings are in communication with each other in the second direction, whereas the first limiting portion and the second limiting portion each comprise an opening, and a width of the passage in a third direction perpendicular to the second direction is less than widths of the two openings in the third direction.

In an embodiment, the pressing element comprises a first step and a second step connected to the first step to form a staircase structure jointly, and the width of the passage is less than a width of the second step in the third direction but greater than or equal to a width of the first step in the third direction.

In an embodiment, the second step matches the opening of the first limiting portion or the opening of the second limiting portion.

In an embodiment, the locking assembly further comprises an elastic element having an end in contact with the linking element and another end in contact with the pressing element.

In an embodiment, the linking element further comprises a hollow-core cylindrical portion protrudingly disposed on the linking element to receive an end of the elastic element, and the pressing element further comprises a sleeve portion connected to the second step and fitted around the cylindrical portion.

In an embodiment, the linking element further comprises a rail extending in the second direction, and the housing comprises a guiding element disposed in the rail.

In an embodiment, the housing comprises a rear side and a lateral side perpendicular to the rear side, the rear side having the battery, and the lateral side having the limiting element.

In an embodiment, the housing comprises a battery chamber for receiving the battery, whereas the first engaging portion and the second engaging portion each comprise a lug, allowing the lug of the first engaging portion to be disposed between the lug of the second engaging portion and the housing.

In conclusion, an electronic device is provided according to an embodiment of the present invention. The locking assembly not only ensures easy replacement of the battery but also enables the battery to be firmly and fixedly disposed on the housing. Therefore, not only is the battery easy to change, but the battery will also not separate from the electronic device even if the electronic device is hit or falls off. Thus, the battery is prevented from inadvertent detachment resulting in a power interruption which in turn causes data loss. Therefore, the operation of the electronic device of the present invention features a high degree of security.

Features and advantages of the present invention are described below with reference to preferred embodiments of the present invention to enable persons skilled in the art to gain insight into the technical solutions of the present invention and implement the present invention accordingly. Persons skilled in the art can easily understand the objectives and advantages of the present invention by making reference to the disclosure contained in the specification, the claims, and the drawings.

DETAILED DESCRIPTION OF THE EMBODIMENTS

Figure 1:
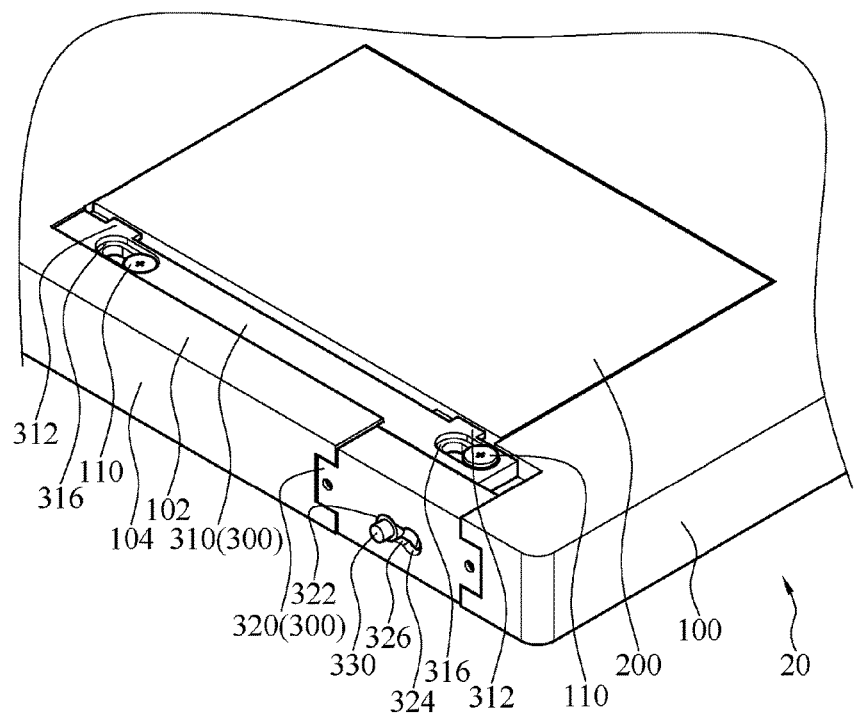
FIG. 1 is a schematic view of an electronic device according to an embodiment of the present invention.

Referring to FIG. 1, there is shown a schematic view of an electronic device 20 according to an embodiment of the present invention. In this embodiment, the electronic device 20 is portable and is, for example, a notebook computer or a tablet, but the present invention is not limited thereto. In this embodiment, the electronic device 20 comprises a housing 100, a battery 200 and a locking assembly 300. The battery 200 is separable; hence, the battery 200 is demountably disposed on the housing 100. The locking assembly 300 enables the battery 200 to be fixedly disposed on the housing 100. The specific mechanism of the locking assembly 300 enables the battery 200 to separate from the housing 100, as described later.

Figure 2:
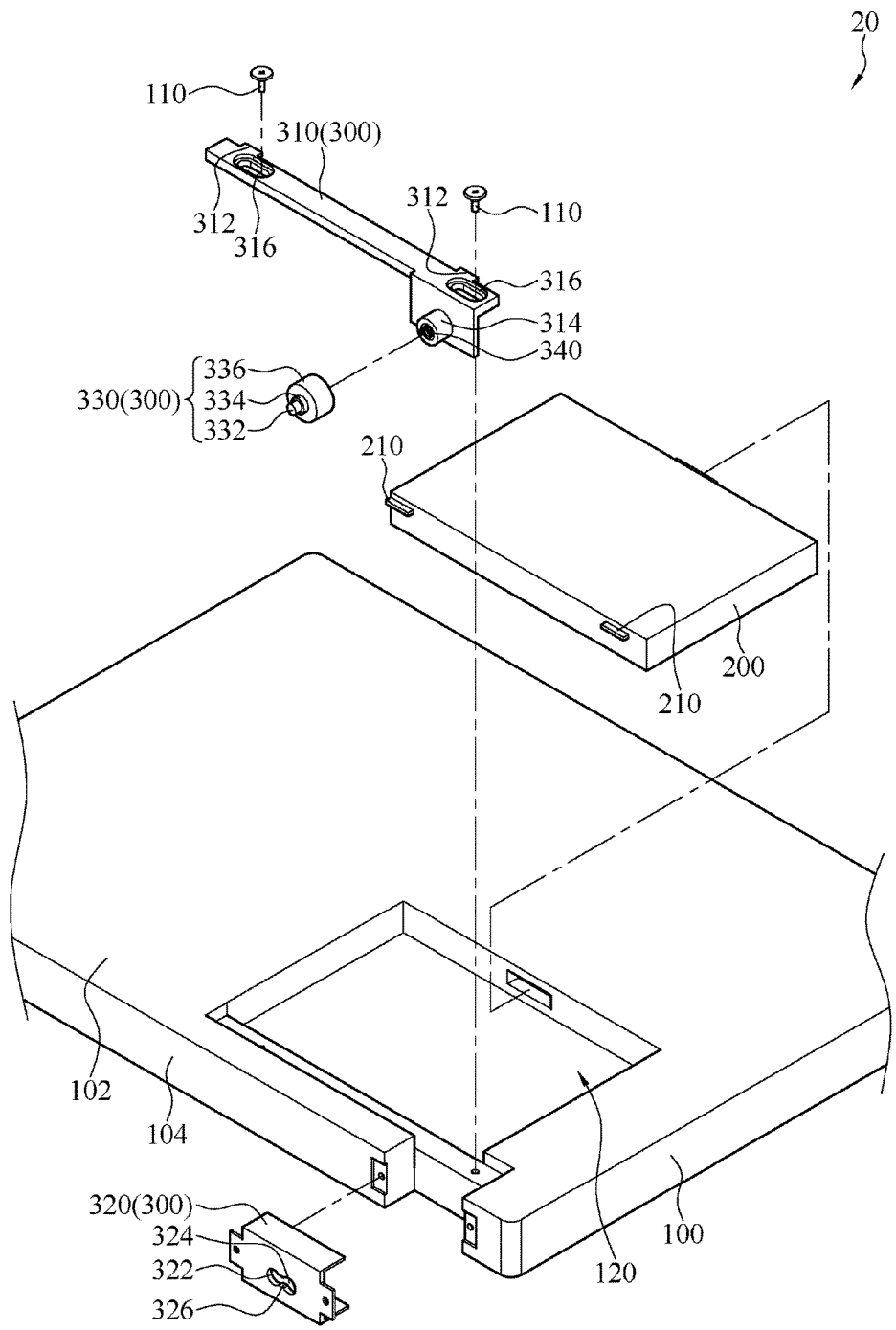
FIG. 2 is an exploded view of the electronic device shown in FIG. 1.

Referring to FIG. 2, there is shown an exploded view of the electronic device 20 shown in FIG. 1. In this embodiment, the battery 200 comprises a first engaging portion 210, whereas the locking assembly 300 comprises a linking element 310, a limiting element 320 and a pressing element 330. The linking element 310 is movably disposed on the housing 100. The linking element 310 comprises a second engaging portion 312. The second engaging portion 312 engages with the first engaging portion 210 such that the battery 200 is fixedly disposed on the housing 100. As soon as the second engaging portion 312 separates from the first engaging portion 210, the battery 200 separates from the housing 100. As shown in FIG. 1 and FIG. 2, the limiting element 320 is disposed on the housing 100, and the limiting element 320 comprises a first limiting portion 322 and a second limiting portion 324. The pressing element 330 is connected to the linking element 310. The pressing element 330 matches both the first limiting portion 322 and the second limiting portion 324. The pressing element 330 is selectively positioned in the first limiting portion 322 or the second limiting portion 324. As soon as the pressing element 330 is positioned in the first limiting portion 322, relative positions of the first engaging portion 210 and the second engaging portion 312 are fixed. The second engaging portion 312 engages with the first engaging portion 210 such that the battery 200 is fixedly disposed on the housing 100. When the pressing element 330 separates from the first limiting portion 322 and moves to the second limiting portion 324, the pressing element 330 drives the linking element 310 to move together with the pressing element 330, whereas the linking element 310 drives the second engaging portion 312 to separate from the first engaging portion 210, causing the battery 200 to separate from the housing 100.

Figure 3:
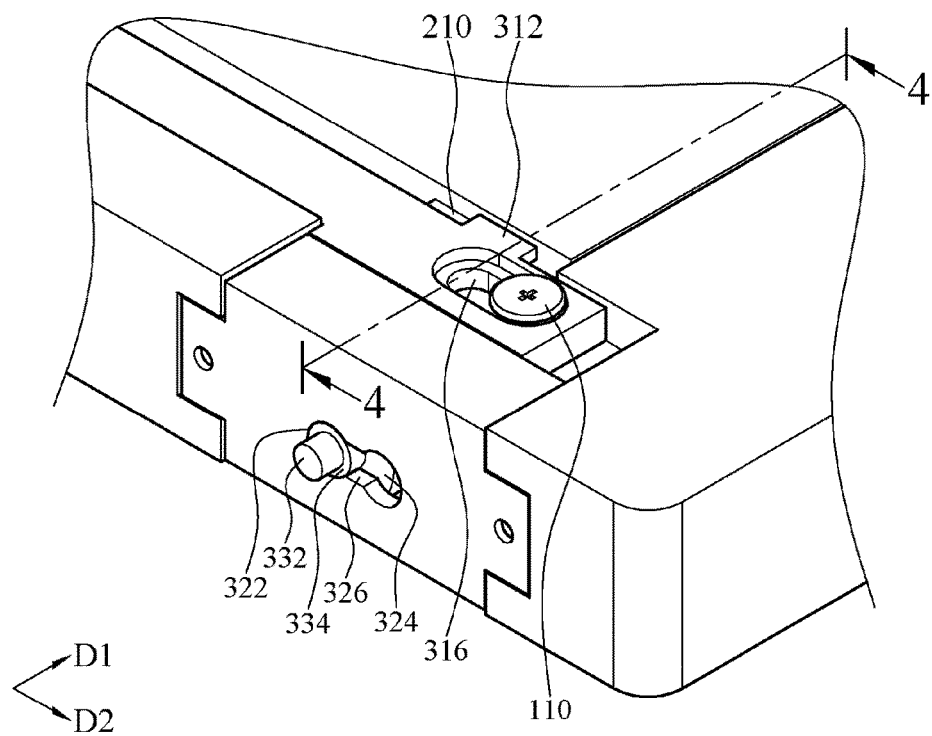
FIG. 3 is a partial enlarged view of the electronic device shown in FIG. 1.
Figure 4:
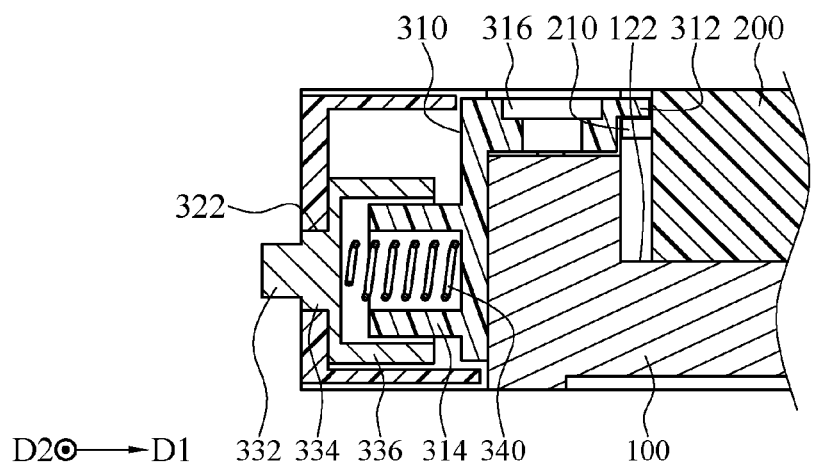
FIG. 4 is a cross-sectional view taken along line 4-4 in FIG. 3.

Referring to FIG. 3 and FIG. 4, there are shown in FIG. 3 a partial enlarged view of the electronic device 20 in FIG. 1, and shown in FIG. 4 a cross-sectional view taken along line 4-4 in FIG. 3. In this embodiment, the pressing element 330 moves in a first direction D1 to separate from the first limiting portion 322 and moves in a direction opposite to the first direction D1 to enter the first limiting portion 322. It is only when the pressing element 330 moves in the first direction D1 to separate from the first limiting portion 322 that the pressing element 330 can move in a second direction D2. By moving in the second direction D2, the pressing element 330 drives the linking element 310 to move in the second direction D2. At this point in time, the linking element 310 drives the second engaging portion 312 to move in the second direction D2 and thereby separate from the first engaging portion 210. The first direction D1 and the second direction D2 are not parallel. Therefore, if the pressing element 330 undergoes a reciprocating motion in the first direction D1 and a direction opposite to the first direction D1 only, the pressing element 330 will not cause the second engaging portion 312 to separate from the first engaging portion 210.

As shown in FIG. 3 and FIG. 4, in this embodiment, the first direction D1 and the second direction D2 are perpendicular to each other. Therefore, if a stress is exerted on the pressing element 330 in the first direction D1, its component in the second direction D2 will approximate to zero, and thus the pressing element 330 will not move in the second direction D2. If an external force is exerted on the pressing element 330 obliquely (for example, there is an included angle of 45° between the direction in which the external force is exerted and the first direction D1), it will have two components in the first direction D1 and the second direction D2, respectively; the component in the first direction D1 causes the pressing element 330 to separate from the first limiting portion 322, but the component in the second direction D2 does not cause the pressing element 330 and the linking element 310 to move in the second direction D2 (because the pressing element 330 is confined to the first limiting portion 322, as described later), and in consequence the second engaging portion 312 does not separate from the first engaging portion 210, allowing the battery 200 to be still disposed on the housing 100 firmly and fixedly.

As shown in FIG. 2 and FIG. 4, in this embodiment, the locking assembly 300 further comprises an elastic element 340. The elastic element 340 has one end in contact with the linking element 310 and the other end in contact with the pressing element 330. As soon as a stress is exerted on the pressing element 330 in the first direction D1, the pressing element 330 moves in the first direction D1; hence, the distance between the pressing element 330 and the linking element 310 is reduced, whereas the elastic element 340 is compressed under a force. As soon as the pressing element 330 stops being subjected to an external force, the pressing element 330 rebounds in the first direction D1 under an elastic restoring force of the elastic element 340 and thereby returns to its initial position. In this embodiment, the elastic element 340 is a spring, but the present invention is not limited thereto.

As shown in FIG. 1, FIG. 2 and FIG. 4, in this embodiment, the housing 100 comprises a rear side 102 and a lateral side 104. The rear side 102 is connected to and perpendicular to the lateral side 104. The battery 200 is disposed on the rear side 102. The limiting element 320 and the pressing element 330 are disposed on the lateral side 104. The housing 100 comprises a battery chamber 120. The battery chamber 120 is inwardly disposed on the rear side 102 of the housing 100. The battery 200 is disposed in the battery chamber 120. While a user is operating the electronic device 20, the rear side 102 is in contact with a supporting surface, such as a desktop, whereas the pressing element 330 on the lateral side 104 facilitates the user's operation. To operate the pressing element 330 and thereby separate the battery 200 from the electronic device 20, the user lifts the electronic device 20 slightly such that the rear side 102 leaves the supporting surface, demounting the battery 200.

As shown in FIG. 1 through FIG. 4, in this embodiment, the first engaging portion 210 and the second engaging portion 312 each comprise lugs. The lugs of the first engaging portion 210 are ear-like structures protruding from one side of the battery 200. The lugs of the second engaging portion 312 are ear-like structures protruding from one side of the linking element 310. As shown in FIG. 1 and FIG. 2, in this embodiment, the first engaging portion 210 has two lugs which are spaced apart, whereas the second engaging portion 312 has two lugs which are spaced apart. The first engaging portion 210 engages with the second engaging portion 312 such that the battery 200 is fixedly disposed in the battery chamber 120; hence, the two lugs of the first engaging portion 210 are disposed between the housing 100 and the two lugs of the second engaging portion 312, respectively. As shown in FIG. 4, the lugs of the first engaging portion 210 are disposed between a bottom 122 of the battery chamber 120 and the lugs of the second engaging portion 312, respectively. Therefore, the lugs of the second engaging portion 312 stand in the way of separation of the lugs of the first engaging portion 210 from the battery chamber 120, thereby allowing the battery 200 to be fixedly disposed in the battery chamber 120.

Figure 5:
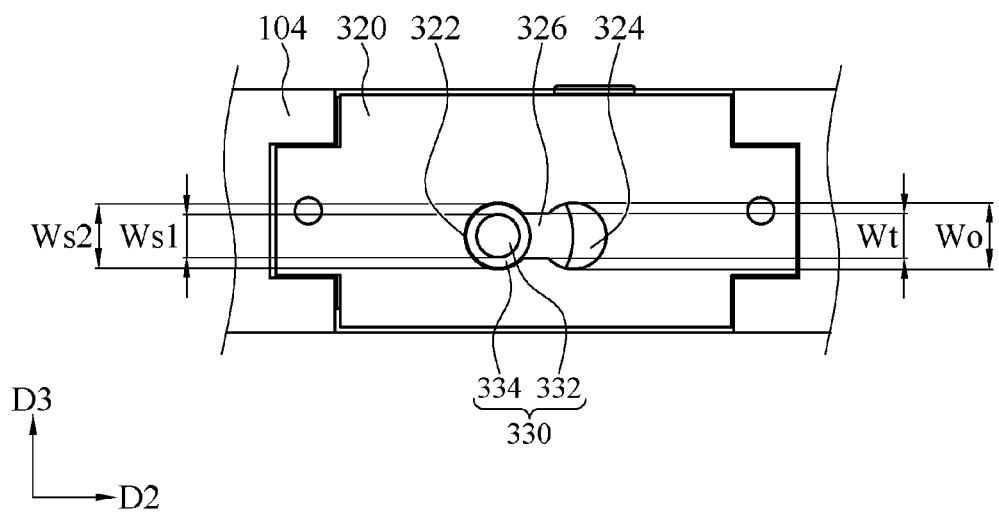
FIG. 5 is a front view of the electronic device shown in FIG. 3.

Referring to FIG. 5, there is shown a front view of the electronic device 20 shown in FIG. 3. As shown in FIG. 3, FIG. 4 and FIG. 5, in this embodiment, the first limiting portion 322 and the second limiting portion 324 each comprise an opening, whereas the limiting element 320 further comprises a passage 326. The two openings of the first limiting portion 322 and the second limiting portion 324 are in communication with each other in the second direction D2 by the passage 326. As shown in FIG. 5, the two openings of the first limiting portion 322 and the second limiting portion 324 are not only round but also equal in shape and size. Therefore, the two openings of the first limiting portion 322 and the second limiting portion 324 are equal in width, i.e., opening width Wo, in a third direction D3. The passage 326 is of a width, i.e., passage width Wt, in the third direction D3. The passage width Wt of the passage 326 in the third direction D3 is less than the opening width Wo of the two openings of the first limiting portion 322 and the second limiting portion 324 in the third direction D3. The third direction D3 is perpendicular to the second direction D2.

As shown in FIG. 2 through FIG. 5, in this embodiment, the pressing element 330 comprises a first step 332 and a second step 334. The first step 332 and the second step 334 are connected in such a manner to form a staircase structure. In this embodiment, the first step 332 and the second step 334 are not only coaxially connected, but also have unequal round profiles. The round profile of the second step 334 not only matches a round profile of the opening of the first limiting portion 322 but also matches a round profile of the opening of the second limiting portion 324. As shown in FIG. 5, in this embodiment, the first step 332 is of a width, i.e., first step width Ws1, in the third direction D3, whereas the second step 334 is of a width, i.e., second step width Ws2, in the third direction D3, wherein second step width Ws2 is greater than first step width Ws1. In the third direction D3, second step width Ws2 is greater than passage width Wt but is substantially equal to opening width Wo, whereas first step width Ws1 is slightly less than passage width Wt.

When the pressing element 330 is located at the first limiting portion 322, and relative positions of the first engaging portion 210 and the second engaging portion 312 are fixed, not only is the second step 334 positioned in the opening of the first limiting portion 322, but the second step 334 and the first limiting portion 322 also match. At this point in time, with second step width Ws2 being greater than passage width Wt, the second step 334 cannot enter the passage 326 in the second direction D2. At this point in time, the second engaging portion 312 cannot separate from the first engaging portion 210 in the second direction D2, ensuring that the battery 200 is fixedly disposed in the battery chamber 120. Second step width Ws2 equals opening width Wo. The round profile of the second step 334 matches the round profile of the opening of the first limiting portion 322; hence, the pressing element 330 is not only prevented from moving in the second direction D2, but also restricted by the first limiting portion 322 and thereby prevented from moving in any direction perpendicular to the first direction D1. Therefore, the connection of the pressing element 330 and the limiting element 320 is stable enough to remain unaffected, thereby preventing generation of noise.

As shown in FIG. 2 and FIG. 4, in this embodiment, the linking element 310 further comprises a hollow-core cylindrical portion 314. The cylindrical portion 314 is protrudingly disposed on the linking element 310. The pressing element 330 further comprises a sleeve portion 336. The sleeve portion 336 is connected to the second step 334. The sleeve portion 336 and the second step 334 are coaxial. The sleeve portion 336 fits around the cylindrical portion 314. The elastic element 340 has one end disposed in the cylindrical portion 314 and the other end disposed in the sleeve portion 336. The sleeve portion 336 and the cylindrical portion 314 match, so as to not only guide movement of the pressing element 330 in the first direction D1 but also ensure that the elastic element 340 is compressed and rebounds in a specific direction.

Figure 6:
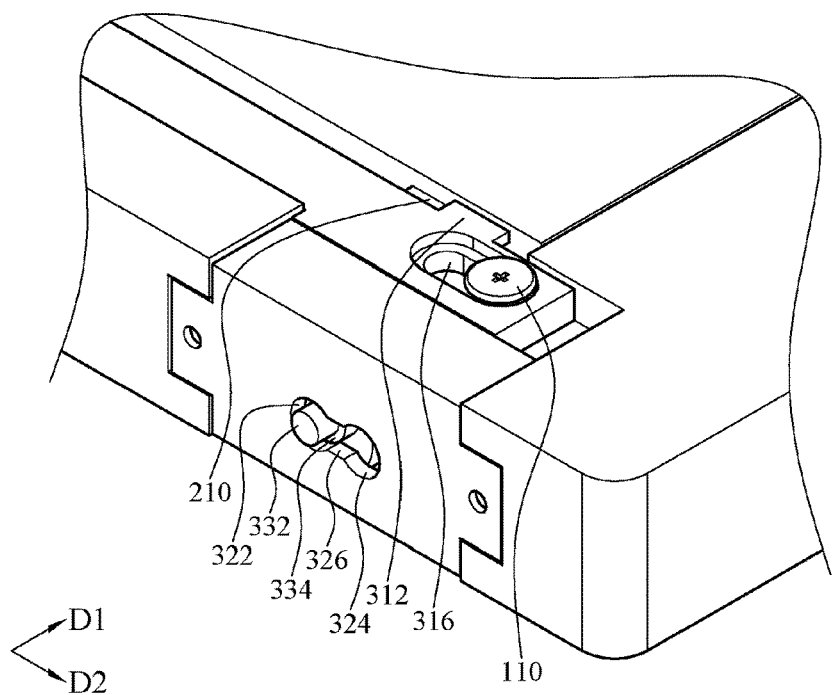
FIG. 6 is a schematic view of an unlocking process I of the electronic device according to an embodiment of the present invention.
Figure 7:
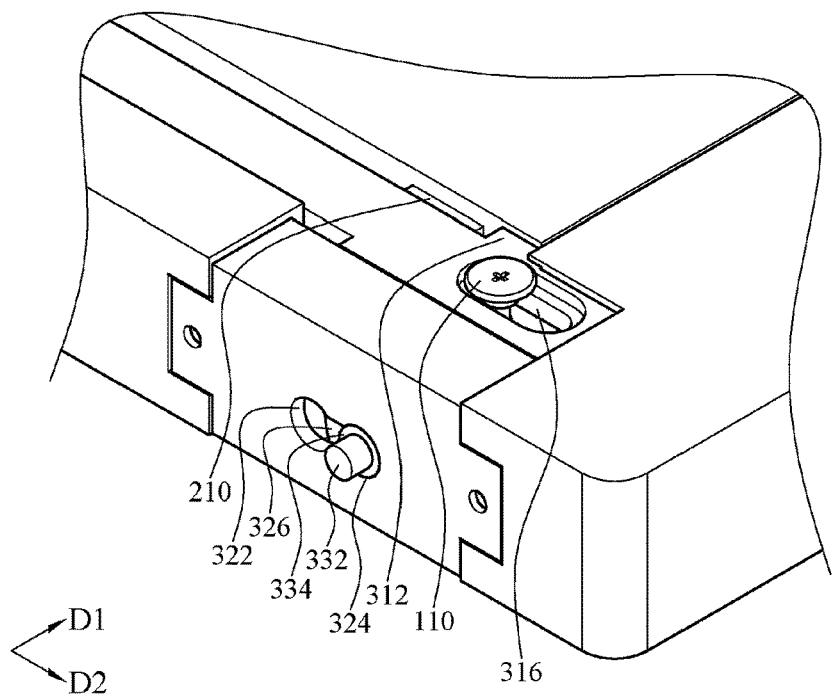
FIG. 7 is a schematic view of an unlocking process II of the electronic device according to an embodiment of the present invention.

Referring to FIG. 6 and FIG. 7, there are shown in FIG. 6 a schematic view of an unlocking process I of the electronic device 20 according to an embodiment of the present invention, and shown in FIG. 7 a schematic view of an unlocking process II of the electronic device 20 according to an embodiment of the present invention. FIG. 3, FIG. 6 and FIG. 7 illustrate a process of the locking assembly 300 changing from a locked state to an unlocked state. As shown in FIG. 3, the second step 334 of the pressing element 330 is positioned in the opening of the first limiting portion 322; at this point in time, the locking assembly 300 is in the locked state, the lugs of the second engaging portion 312 press against the lugs of the first engaging portion 210 such that the battery 200 is fixedly disposed in the battery chamber 120 without any possibility of escape, not to mention that the pressing element 330 is prevented from moving in the second direction D2. Under this condition, even if the electronic device 20 is hit or falls off to the ground and therefore the pressing element 330 is subjected to an external force, the pressing element 330 will move only in the first direction D1. As soon as the external force vanishes, the elastic element 340 returns to its initial state under its own elastic restoring force. Therefore, even if the electronic device 20 is hit or falls off to the ground, engagement status of the second engaging portion 312 and the first engaging portion 210 will remain unchanged, and in consequence the battery 200 will not inadvertently separate from the battery chamber 120.

As shown in FIG. 6, to allow the battery 200 to separate from the battery chamber 120, the user presses the pressing element 330 to allow the pressing element 330 to move in the first direction D1 until the second step 334 separates from the opening of the first limiting portion 322 fully. At this point in time, the first step 332 enters the opening of the first limiting portion 322. Since first step width Ws1 is slightly less than passage width Wt, the user pushes the pressing element 330 in the second direction D2 to not only allow the pressing element 330 to move in the second direction D2 but also allow the first step 332 to pass through the passage 326 and enter the opening of the second limiting portion 324; meanwhile, the second engaging portion 312 moves in the second direction D2 to separate from the first engaging portion 210. As shown in FIG. 7, when the first step 332 is in the opening of the second limiting portion 324, the second engaging portion 312 separates from the first engaging portion 210 fully. At this point in time, the locking assembly 300 is in the unlocked state, the battery 200 is separable from the battery chamber 120. Furthermore, the user releases the pressing element 330 such that the second step 334 enters the opening of the second limiting portion 324 because of the rebound of the elastic element 340. Therefore, the pressing element 330 is prevented from moving in the second direction D2, and the locking assembly 300 stays in the unlocked state, allowing the user to place the battery 200 in the battery chamber 120.

As shown in FIG. 5, in a variant embodiment, first step width Ws1 is equal to passage width Wt or slightly greater than passage width Wt. In the situation where first step width Ws1 is slightly greater than passage width Wt, after pressing the pressing element 330 to cause the first step 332 to enter the opening of the first limiting portion 322, the user has to exert a great force in order for the first step 332 to pass through the passage 326 and enter the opening of the second limiting portion 324; it is because the great force is required to counteract the great friction between the passage 326 and the first step 332 in order for the first step 332 to move in the second direction D2 and pass through the passage 326. Therefore, even if the pressing element 330 is pressed inadvertently, the pressing element 330 will not pass through the passage 326 under a possible component of force in the second direction D2.

As shown in FIG. 2, FIG. 3, FIG. 6 and FIG. 7, in this embodiment, the linking element 310 further comprises a rail 316. The rail 316 is disposed on the rear side 102 of the housing 100. The rail 316 extends in the second direction D2. The housing 100 comprises a guiding element 110. The guiding element 110 is fixed to the rear side 102 of the housing 100. The guiding element 110 is disposed in the rail 316. While the pressing element 330 is driving the linking element 310 to move in the second direction D2, the rail 316 and the guiding element 110 move relative to each other in the second direction D2. The rail 316 and the guiding element 110 match to not only place a limitation on the direction in which the linking element 310 moves but also enhance the stability of movement of the linking element 310 by allowing the linking element 310 to be close to the rear side 102 of the housing 100 while moving.

In conclusion, an electronic device is provided according to an embodiment of the present invention. The locking assembly not only ensures easy replacement of the battery but also enables the battery to be firmly and fixedly disposed on the housing. Therefore, not only is the battery easy to change, but the battery will also not separate from the electronic device even if the electronic device is hit or falls off, because the locking assembly has a two-section (pressing in the first direction and pushing in the second direction) locking and unlocking mechanism in different directions. Thus, the battery is prevented from inadvertent detachment resulting in a power interruption which in turn causes data loss. Therefore, the operation of the electronic device of the present invention features a high degree of security.

Although the present invention is disclosed above by preferred embodiments, the preferred embodiments are not restrictive of the present invention. Changes and modifications made by persons skilled in the art to the preferred embodiments without departing from the spirit of the present invention must be deemed falling within the scope of the present invention. Accordingly, the legal protection for the present invention should be defined by the appended claims.

What is claimed is:

1. An electronic device, comprising: a housing; a battery demountably disposed on the housing and comprising a first engaging portion; and a locking assembly, comprising: a linking element movably disposed on the housing and comprising a second engaging portion, wherein the second engaging portion engages with the first engaging portion, allowing the battery to be fixedly disposed on the housing; a limiting element disposed on the housing and comprising a first limiting portion and a second limiting portion; and a pressing element connected to the linking element and disposed at the first limiting portion to fix relative positions of the first engaging portion and the second engaging portion, wherein, when the pressing element separates from the first limiting portion and moves to the second limiting portion, the linking element drives the second engaging portion to separate from the first engaging portion, causing the battery to separate from the housing; wherein the housing comprises a battery chamber for receiving the battery, whereas the first engaging portion and the second engaging portion each comprise a lug, allowing the lug of the first engaging portion to be disposed between the lug of the second engaging portion and the housing.

2. The electronic device of claim 1, wherein the pressing element moves in a first direction to separate from the first limiting portion, whereas the linking element drives the second engaging portion to move in a second direction and thereby separate from the first engaging portion, wherein the first direction and the second direction are not parallel.

3. The electronic device of claim 2, wherein the first direction and the second direction are perpendicular to each other.

4. The electronic device of claim 2, wherein the linking element further comprises a rail extending in the second direction, and the housing comprises a guiding element disposed in the rail.

5. The electronic device of claim 1, wherein the housing comprises a rear side and a lateral side perpendicular to the rear side, the rear side having the battery, and the lateral side having the limiting element.

6. An electronic device, comprising: a housing; a battery demountably disposed on the housing and comprising a first engaging portion; and a locking assembly, comprising: a linking element movably disposed on the housing and comprising a second engaging portion, wherein the second engaging portion engages with the first engaging portion, allowing the battery to be fixedly disposed on the housing; a limiting element disposed on the housing and comprising a first limiting portion and a second limiting portion; and a pressing element connected to the linking element and disposed at the first limiting portion to fix relative positions of the first engaging portion and the second engaging portion, wherein, when the pressing element separates from the first limiting portion and moves to the second limiting portion, the linking element drives the second engaging portion to separate from the first engaging portion, causing the battery to separate from the housing; wherein the pressing element moves in a first direction to separate from the first limiting portion, whereas the linking element drives the second engaging portion to move in a second direction and thereby separate from the first engaging portion, wherein the first direction and the second direction are not parallel; and wherein the first limiting portion and the second limiting portion each comprise an opening, whereas the limiting element comprises a passage whereby the two openings are in communication with each other in the second direction, and a width of the passage in a third direction perpendicular to the second direction is less than widths of the two openings in the third direction.

7. The electronic device of claim 6, wherein the pressing element comprises a first step and a second step connected to the first step to form a staircase structure jointly, and the width of the passage is less than a width of the second step in the third direction but greater than or equal to a width of the first step in the third direction.

8. The electronic device of claim 7, wherein the second step matches one of the opening of the first limiting portion and the opening of the second limiting portion.

9. The electronic device of claim 7, wherein the locking assembly further comprises an elastic element having an end in contact with the linking element and another end in contact with the pressing element.

10. The electronic device of claim 9, wherein the linking element further comprises a hollow-core cylindrical portion protrudingly disposed on the linking element to receive an end of the elastic element, and the pressing element further comprises a sleeve portion connected to the second step and fitted around the cylindrical portion.

11. The electronic device of claim 6, wherein the housing comprises a rear side and a lateral side perpendicular to the rear side, the rear side having the battery, and the lateral side having the limiting element.

12. The electronic device of claim 6, wherein the first direction and the second direction are perpendicular to each other.

13. The electronic device of claim 6, wherein the linking element further comprises a rail extending in the second direction, and the housing comprises a guiding element disposed in the rail.

* * * * *